(12) United States Patent
Lee (10) Patent No.: US 7,583,768 B2
(45) Date of Patent: Sep. 1, 2009

(54) APPARATUS FOR CANCELING INTERSYMBOL INTERFERENCE IN SEMICONDUCTOR MEMORY DEVICE AND METHOD THEREOF

(75) Inventor: Won-Ju Lee, Gyeonggi-do (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 856 days.

(21) Appl. No.: 11/020,851

(22) Filed: Dec. 22, 2004

(65) Prior Publication Data
US 2005/0135519 A1    Jun. 23, 2005

(30) Foreign Application Priority Data
Dec. 23, 2003  (KR) ............... 10-2003-0095139

(51) Int. Cl.
*H04L 1/00* (2006.01)
*H04B 3/20* (2006.01)
*H04M 9/08* (2006.01)
*H04B 1/10* (2006.01)

(52) U.S. Cl. ............ 375/348; 370/286; 379/406.01; 455/296

(58) Field of Classification Search .......... 375/254, 375/285, 296, 346, 348; 370/286, 289; 379/406.01, 379/406.05; 455/501, 114.2, 114.3, 295, 455/296

See application file for complete search history.

(56) References Cited

U.S. PATENT DOCUMENTS

| 5,774,505 | A | * | 6/1998 | Baugh ...................... 375/348 |
| 6,038,266 | A | | 3/2000 | Lee et al. |
| 6,157,688 | A | | 12/2000 | Tamura et al. |
| 6,377,637 | B1 | | 4/2002 | Berdugo |
| 6,493,394 | B2 | * | 12/2002 | Tamura et al. ............. 375/257 |
| 7,003,028 | B1 | * | 2/2006 | Bishop et al. ............. 375/232 |
| 2004/0203559 | A1 | * | 10/2004 | Stojanovic et al. ........ 455/403 |

* cited by examiner

*Primary Examiner*—Young T. Tse
(74) *Attorney, Agent, or Firm*—Marger Johnson & McCollom, P.C.

(57) ABSTRACT

We provide an ISI canceling circuit including a storing unit to store an ISI value associated with a received signal, an operator to generate an operator output signal by subtracting the ISI value from the received signal, and a comparator to manipulate the operator output signal responsive to an operating mode. We also provide a method for canceling ISI that includes storing a base voltage value of the received signal, sequentially storing ISI values of the received signal at time points when ISI is desired to be canceled, generating a difference between each of the stored ISI values and the stored base voltage value, and amplifying the subtracted signal to determine its logic state.

21 Claims, 10 Drawing Sheets

APPARATUS FOR CANCELING INTERSYMBOL INTERFERENCE IN SEMICONDUCTOR MEMORY DEVICE AND METHOD THEREOF

CROSS-REFERENCE TO RELATED APPLICATION

This application claims the benefit of Korean Patent Application No. 2003-95139, filed on Dec. 23, 2003, which we incorporate by reference.

BACKGROUND

1. Technical Field

The present invention relates to a semiconductor memory device and, more particularly, to a device and method for canceling an Inter Symbol Interference (ISI) component of a received signal.

2. Related Art

There has been a recent trend towards increasing clock frequency and data transfer rate with semiconductor technology advances. With personal computers (PC), the clock frequency of a central processing unit (CPU) has significantly evolved beyond 3 GHz while the CPU's peripheral devices data transfer rates lag behind. In dynamic random access memory (DRAM) devices, particularly, data transfer rates degrade because distortion caused by ISI that arise, in turn, because of limited channel bandwidth and multi-drop structure. Where a DRAM bus is designed to have one channel, an increase in channel loading may also limit bandwidth, thus causing ISI. This ISI may also distort a received signal and degrade the data transfer rate. Further, where the DRAM bus is configured with a multi-drop bus architecture that has a plurality of slots and discontinuous points, an originally received signal is distorted by waves reflected from other chips. The ISI due to bandwidth limitation is referred to as linear ISI. The signal distortion caused by a reflected wave in the multi-drop architecture is referred to as to nonlinear ISI. Because both the linear and nonlinear ISI cause distortion to the received signal, they are collectively called ISI.

Figure 1:
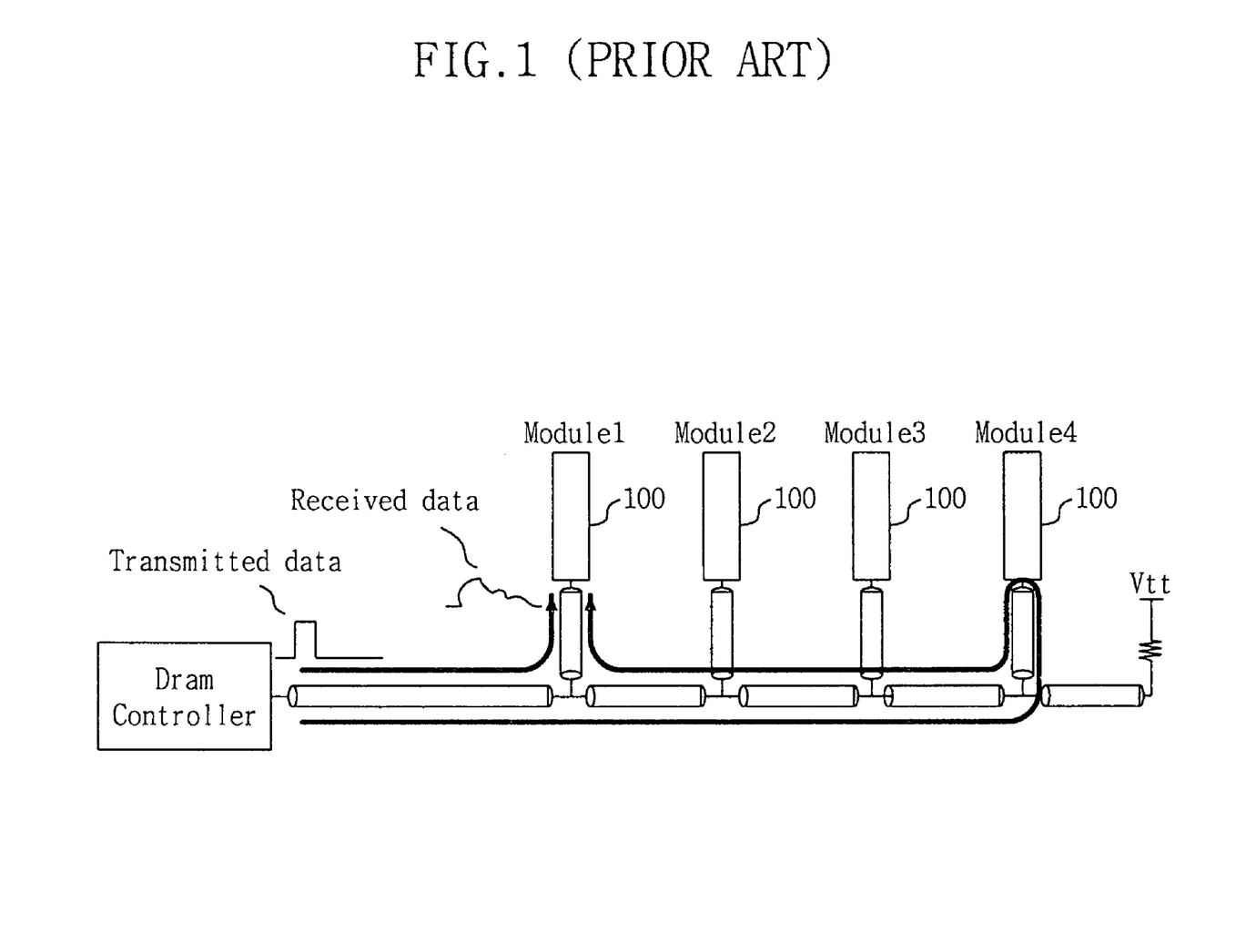
FIG. 1 is a block diagram of a DRAM multi-drop bus.
Figure 2:
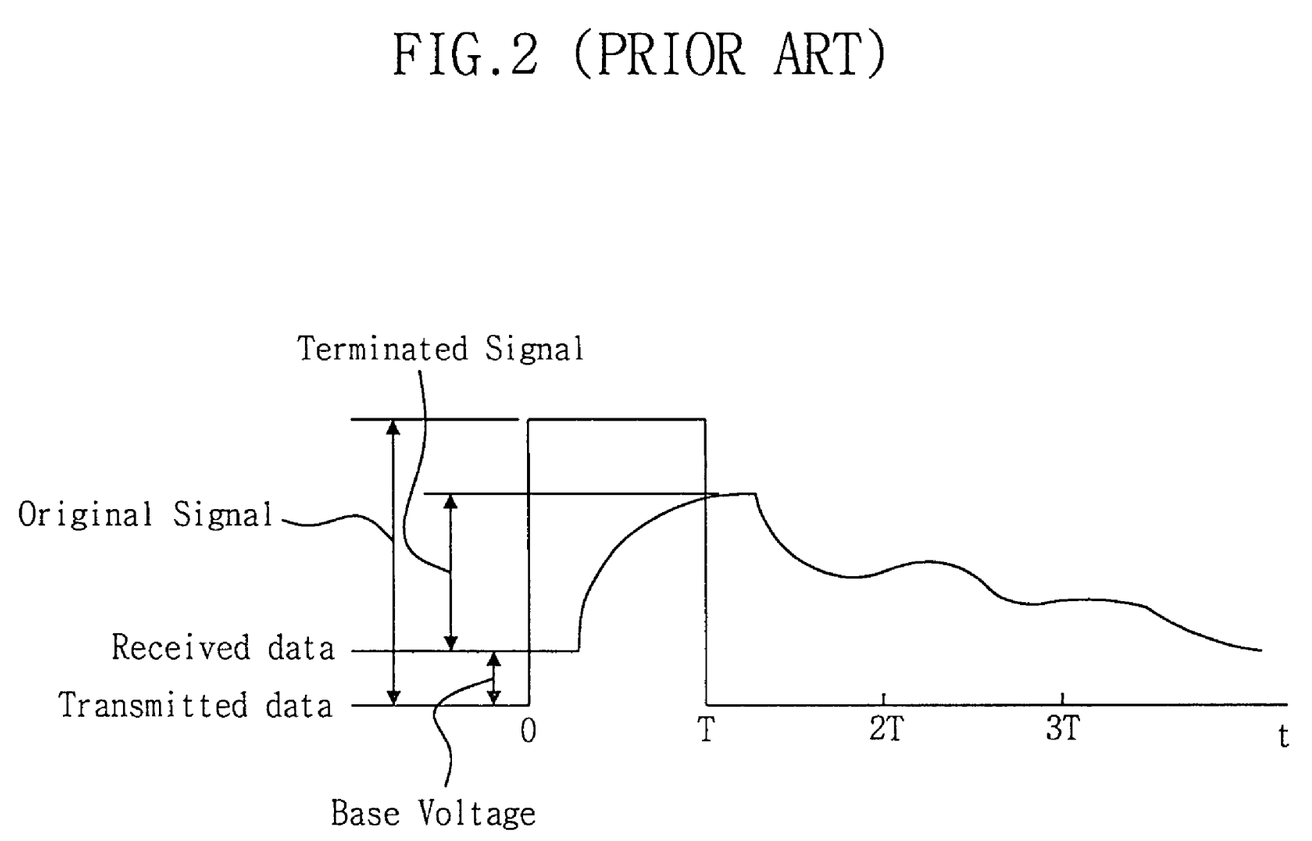
FIG. 2 is a waveform diagram of an ISI distorted signal associated with the DRAM multi-drop bus shown in FIG. 1.

FIG. 1 is a block diagram showing a DRAM multi-drop bus where ISI arises. FIG. 2 is a waveform diagram illustrating a received signal that is ISI modified by FIG. 1. Brief descriptions will be given with reference to these figures.

Referring to FIG. 1, the bus transmits and receives signals between the DRAM and a DRAM controller over a transmission line made of a printed circuit board (PCB). In this multi-drop bus there are two ranks in each of four slots. Where the DRAMs present in the respective ranks are shared by the same module or other modules, pin loading increases. This increase in pin loading causes ISI because of reflected waves received from other chips, thus severely distorting transmitted data.

FIG. 2 shows a profile of a transmitted signal whose amplitude is reduced by termination resistance and which is distorted by ISI. In an environment, such as a stub-series terminated logic (SSTL) interface, the base voltage may have a non-zero value because of the termination resistance. In such a case, even though there is no ISI, a received signal is reduced in amplitude, and may contain an unnecessary ISI component due to influence from linear and nonlinear ISI.

An input buffer is usually capable of recognizing an ISI distorted signal as shown in FIG. 2. ISI distorted signal recognition advances continue. For example, a decision feedback equalizer (DFE) circuit for reducing ISI on a SSTL signal transmission line is suggested in U.S. Pat. No. 6,493, 394. Similar circuits are also suggested in U.S. Pat. Nos. 6,377,637 and 6,157,688. In these circuits, however, the linear ISI and nonlinear ISI cannot be optimally canceled in the transmission system of a DRAM multi-drop bus architecture including an SSTL interface. This is because these circuits address reducing ISI on transmission lines.

INVENTION SUMMARY

It is an object of the invention to overcome disadvantages associated with prior ISI canceling circuits and methods in semiconductor memory devices.

We provide an ISI canceling circuit including a storing unit to store an ISI value associated with a received signal, an operator to generate an operator output signal by subtracting the ISI value from the received signal, and a comparator to manipulate the operator output signal responsive to an operating mode.

The comparator may provide the operator output signal to the storing unit in a training mode and the comparator outputs the operator output signal in a normal mode.

The storing unit may include a first storing unit to store a base voltage value corresponding to the received signal and at least one second storing unit to store ISI values corresponding to the received signal.

The ISI canceling circuit may include a clock signal generating unit for generating clock signals and providing the clock signals to the storing unit. The clock signals may be sequentially generated multi-phase clock signals. The multi-phase clock signal may have as many phases as storing units.

The operator may generate the operator output signal responsive to a preamble signal. The preamble signal is a pulse signal having a duty cycle of 1/(quantity of the storing units).

The storing unit may include an up/down counter to count the output signal and a digital-analog converter to convert the counted output signal to an analog signal. The up/down counter may store the base voltage value of the received signal or the ISI values at the time points when ISI is desired to be canceled. The digital-analog converter may convert the stored value stored in the up/down counter to an analog signal and provides the analog signal to the operator. The up/down counter and the digital-analog converter may operate at a frequency of (data transmission frequency)/(quantity of the storing units).

The first storing unit may increase and decrease the operator output signal until it is minimized and may store the base voltage value of the received signal in the training mode. And the first storing unit may provide the stored base voltage value to the operator in the normal mode.

The second storing unit may increase and decrease the output signal from the operator until it is minimized and stores respective ISI values of the received signal corresponding to relevant clock signals in the training mode. And the second storing unit may provide each of the stored ISI values to the operator in the normal mode.

The storing unit may operate responsive to a clock signal.

The operator may subtract the ISI value from the receive signal until a difference is minimized in a training mode and the operator may subtract the ISI value and a base voltage value from the received signal in a normal mode.

We also provide a method for canceling ISI that includes storing a base voltage value of the received signal, sequentially storing ISI values of the received signal at time points when ISI is desired to be canceled, generating a difference between each of the stored ISI values and the stored base voltage value, and amplifying the subtracted signal to determine its logic state.

The method may include applying a preamble signal to predict an ISI value of the received signal prior to transmitting the received signal.

The method may include generating a multi-phase clock signal responsive to the base voltage value.

The method may include generating a multi-phase clock signal responsive to ISI cancellation timing.

According to an aspect of the present invention for achieving the aforementioned objects, there is provided a device for canceling ISI of a received signal in a semiconductor memory device, comprising: a storing unit, the storing unit including a first storing unit for storing a base voltage value of the received signal and at least a second storing unit for storing ISI values of the received signal at time points when ISI is desired to be canceled; an operator for receiving the stored value from the storing unit and subtracting the stored value from the received signal; and a comparator for amplifying an output signal from the operator, and for feeding resultant data back to the storing unit in a training mode and outputting the data in a normal mode.

Further, the device further comprises a clock signal generating unit for generating clock signals to the storing unit at a time point when the base voltage value of the received signal is desired to be stored and time points when ISI is desired to be canceled.

The training mode operation is performed by applying a preamble signal for predicting the ISI values of the received signal to the ISI canceling device prior to transmitting the received signal.

According to another aspect of the present invention for achieving the aforementioned objects, there is provided a method for canceling ISI of a received signal in a semiconductor memory device, the method including steps of: storing a base voltage value of the received signal; sequentially storing ISI values of the received signal at time points when ISI is desired to be canceled; subtracting, from the received signal, a difference between each of the stored ISI values at the time points when ISI is desired to be canceled and the stored base voltage value; and amplifying the subtracted signal to determine its logical state.

Further, the method further includes a step of applying a preamble signal for predicting the ISI of the received signal prior to transmitting the received signal. The method further includes a step of generating a multi-phase clock signal at a time point when the base voltage value of the received signal is desired to be stored and time points when ISI is desired to be canceled.

BRIEF DRAWINGS DESCRIPTION

The above and other features and advantages of the present invention will become more apparent to those of ordinary skill in the art by describing in detail preferred embodiments with reference to the following drawings.

DETAILED INVENTION DESCRIPTION

We will now describe the present invention more fully with reference to the accompanying drawings. This invention may, however, be embodied in different forms and should not be construed as limited to the embodiments set forth here. These embodiments are rather provided so this disclosure will be thorough and complete, and will fully convey the scope of the invention to those skilled in the art. Like numbers refer to like elements throughout the specification.

Figure 3:
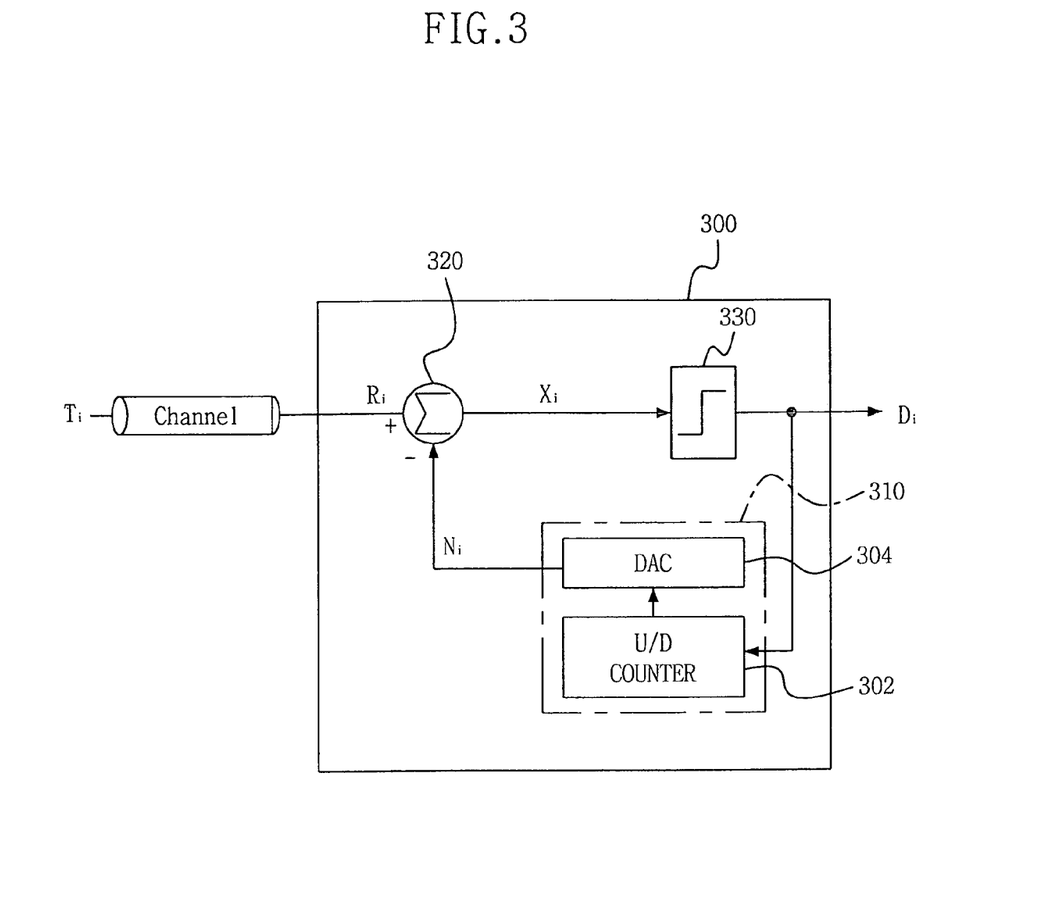
FIG. 3 is a block diagram of an ISI canceling device according to an embodiment of the present invention.
Figure 4:
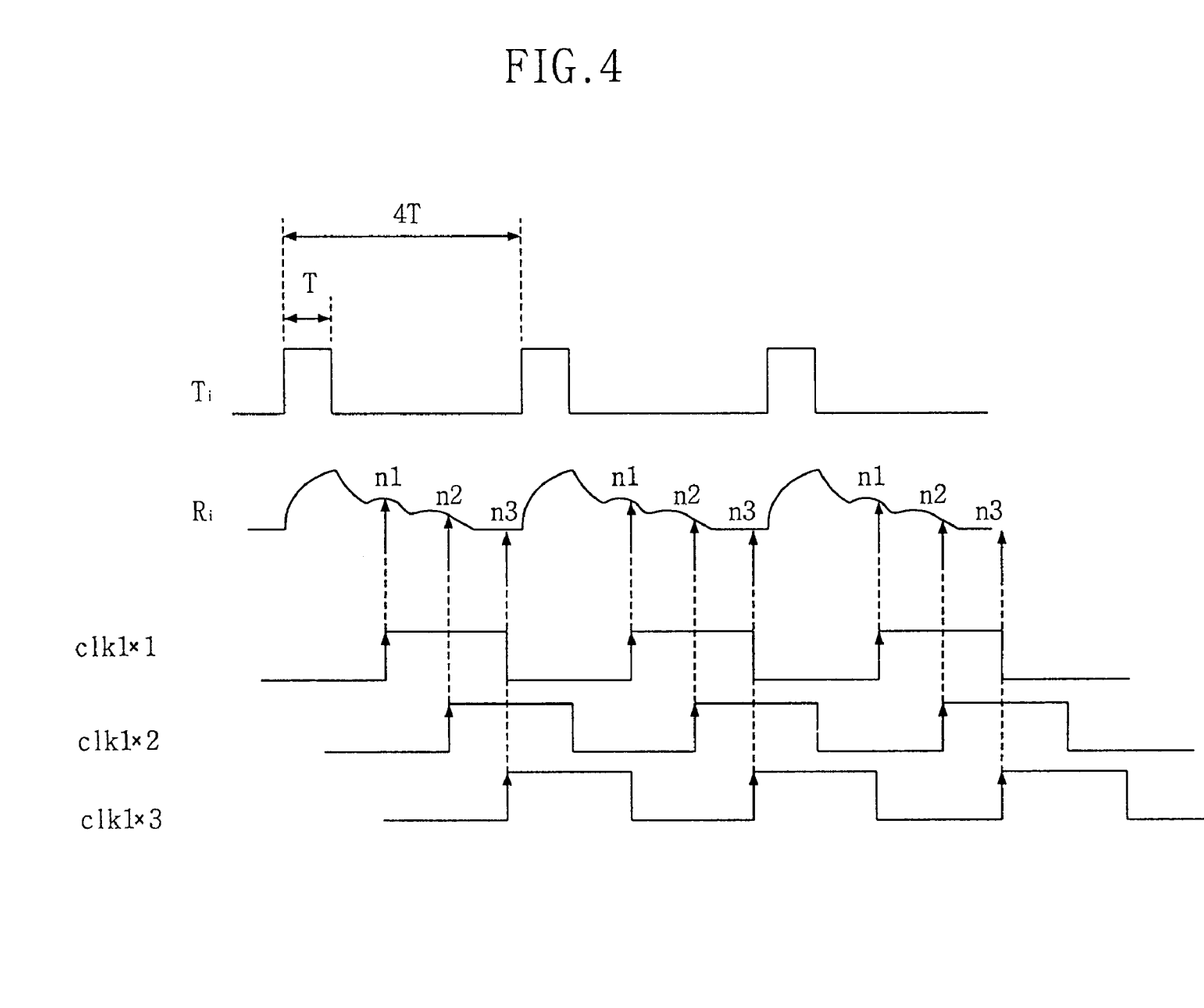
FIG. 4 is an operational timing diagram of a preamble signal and a clock signal associated with the ISI canceling device shown in FIG. 3.

FIG. 3 is a block diagram showing an ISI canceling device 300 according to an embodiment of the present invention. FIG. 4 is a timing diagram of preamble and clock signals for the ISI canceling device 300 shown in FIG. 3. We describe the configuration and operation of the ISI canceling device 300 according to an embodiment of the present invention with reference to FIGS. 3 and 4.

Referring to FIGS. 3 and 4, the ISI canceling device 300 includes a storing unit 310 for storing a base voltage value of a received signal containing an ISI component or ISI values at time points when ISI is desired to be canceled. This embodiment further includes an operator 320 for receiving the stored value from the storing unit 310 and subtracting the stored value from the received signal. A comparator 330 is also included for amplifying an output signal from the operator 320 so that its logic state can be determined. The comparator 330 feeds resultant data back to the storing unit 310 in a training mode and outputs the resultant data in a normal mode.

The storing unit 310 includes a first storing unit for storing the base voltage value of a received signal Ri, and at least one second storing unit for storing the ISI values of the received signal Ri corresponding to relevant clock signals clk1×1, clk1×2 and clk1×3. For example, where the ISI is desired to be canceled at three time points n1, n2 and n3, as shown in FIG. 4, three second storing units are necessary. Further, each of the storing units 310 includes one up/down counter 302 and one digital-analog converter (DAC) 304. In the training mode, the up/down counter 302 operates when the base voltage value of either the received signal is desired to be stored or at the time points n1, n2 and n3 when the ISI is desired to be canceled. The up/down counter 302 increases and decreases the output signal Xi from the operator until it is minimized, and stores the base voltage value of the received signal or the ISI values at the time points when ISI is desired to be canceled. The DAC 304 converts the digital signal that has been increased and decreased by the up/down counter 302, to an analog signal provided to the operator 320. After the training mode ends and the normal mode begins, the DAC 304 converts the stored value, which has been stored in the up/down counter 302, to an analog signal. This analog signal is then provided to the operator 320. Further, the up/down counter 302 and the DAC 304 operate at a frequency up to (data transmission frequency)/(the number of the storing units). Thus, the operating speed burden of the up/down counter and the data transmission speed of the digital-analog converter are reduced.

The operator 320 may include a subtractor. In the training mode, the operator 320 subtracts the stored value Ni in the storing unit from the received signal Ri until the difference is minimized. This is done so that the base voltage value of the received signal or the ISI values at the time points when ISI is desired to be canceled is stored in the storing unit 310. In the normal mode, the operator 320 receives the stored value Base0 (the base voltage value in the first storing unit) or ISIi (the ISI values in the second storing unit) from the storing unit 310. The operator 320 then subtracts these values from the received signal Ri to cancel only pure ISI values. The reason this is done is that since each of the ISI values stored in the second storing unit contain an amplitude-reducing value for the received signal produced by termination resistance, namely, a base voltage value, the base voltage value of the received signal must be considered in order to cancel only the pure ISI component. Accordingly, the operator 320 will provide a signal in which only the ISI component of the received signal at time points when ISI is desired to be canceled has been canceled, to the comparator 330 in the normal mode.

The comparator 330 to amplify the voltage difference that is an output signal from the operator, so that its logical state is determined. The comparator 330 feeds resultant data back to the storing unit in the training mode and outputs the resultant data in the normal mode.

Further, in an embodiment of the present invention, a preamble signal Ti is continuously applied to the ISI canceling device 300 to predict the base voltage value of the received signal and the ISI values at the time points when ISI is desired to be canceled. The preamble signal Ti is applied prior to transmitting the received signal for operation of the training mode. In the training mode, the base voltage value and ISI values at the time points when ISI is desired to be canceled are predicted using the preamble signal Ti and are stored in the storing unit 310. This is done so that in the normal mode, only the ISI component of the received signal is canceled responsive to the predicted stored value. Accordingly, the training mode must be performed after the system is powered up and before the semiconductor memory operates in normal mode. And the number of the preamble signals must be determined based upon the precision of the ISI canceling device 300, namely, the number of bits used by the up/down counter 302 and the digital-analog converter 304, which constitute the storing unit 310. For example, where the storing unit is composed of a 6-bit up/down counter and 6-bit digital-analog converter, sixty-four preamble signals are required to predict one ISI. If, e.g., there are three time points when ISI is desired to be predicted, as shown in FIG. 4, the preamble signal has a period 4T of four pulse signals. The number of pulse signals being the number of the second storing units+1 or the total number of the storing units. A pulse signal that has a duty cycle of 1/(the number of the storing units) is also continuously applied. As the number of time points when ISI is desired to be predicted increase, the duty cycle will decrease in inverse proportion.

Further, in the training mode, in order to operate the up/down counter 302 at a time point when the base voltage value of the received signal is desired to be stored and at time points n1, n2 and n3 when ISI is desired to be canceled, clock signals clk1×0, clk1×1, clk1×2 and clk1×3 are generated at the relevant time points and are provided to the up/down counter 302. The clock signals clk1×0, clk1×1, clk1×2 and clk1×3 have the same number of phases as there are storing units. These clock signals are multi-phase clock signals sequentially generated at the time point when the base voltage value of the received signal is desired to be stored and the time points n1, n2 and n3 when ISI is desired to be canceled.

Figure 5:
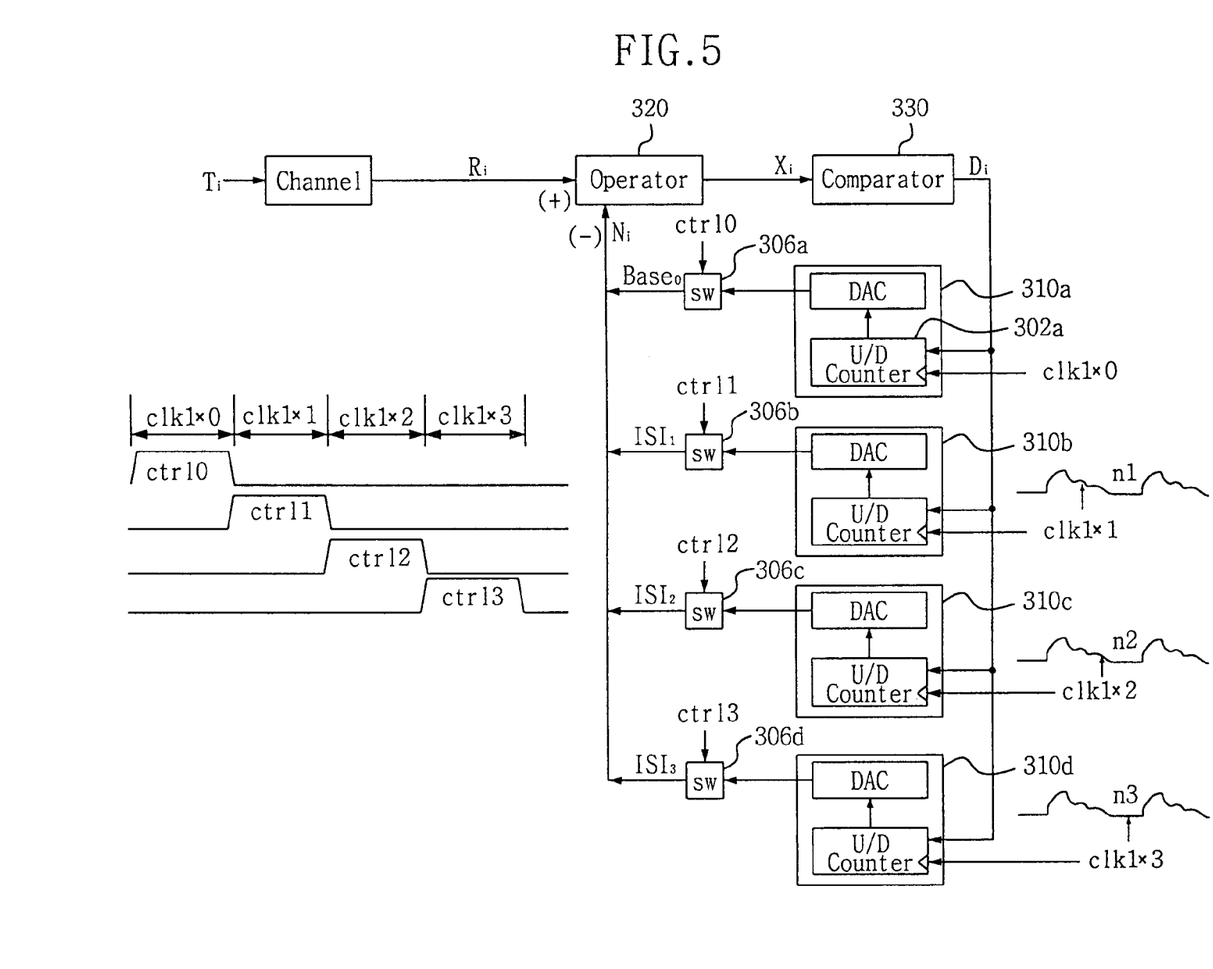
FIG. 5 is a block diagram of an ISI canceling device in a training mode according to an embodiment of the present invention.
Figure 6:
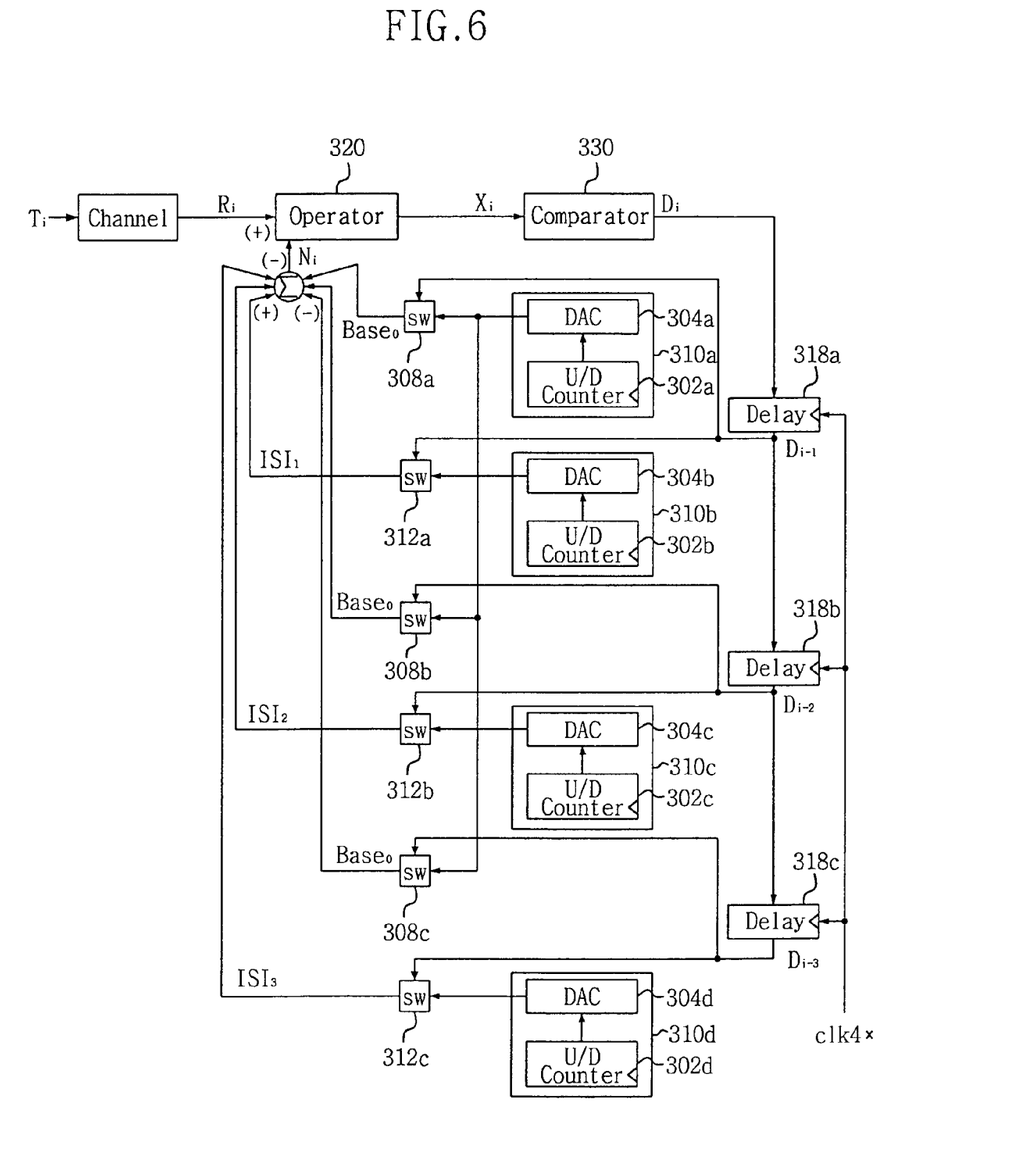
FIG. 6 is a block diagram of an ISI canceling device in a normal mode according to an embodiment of the present invention.
Figure 7:
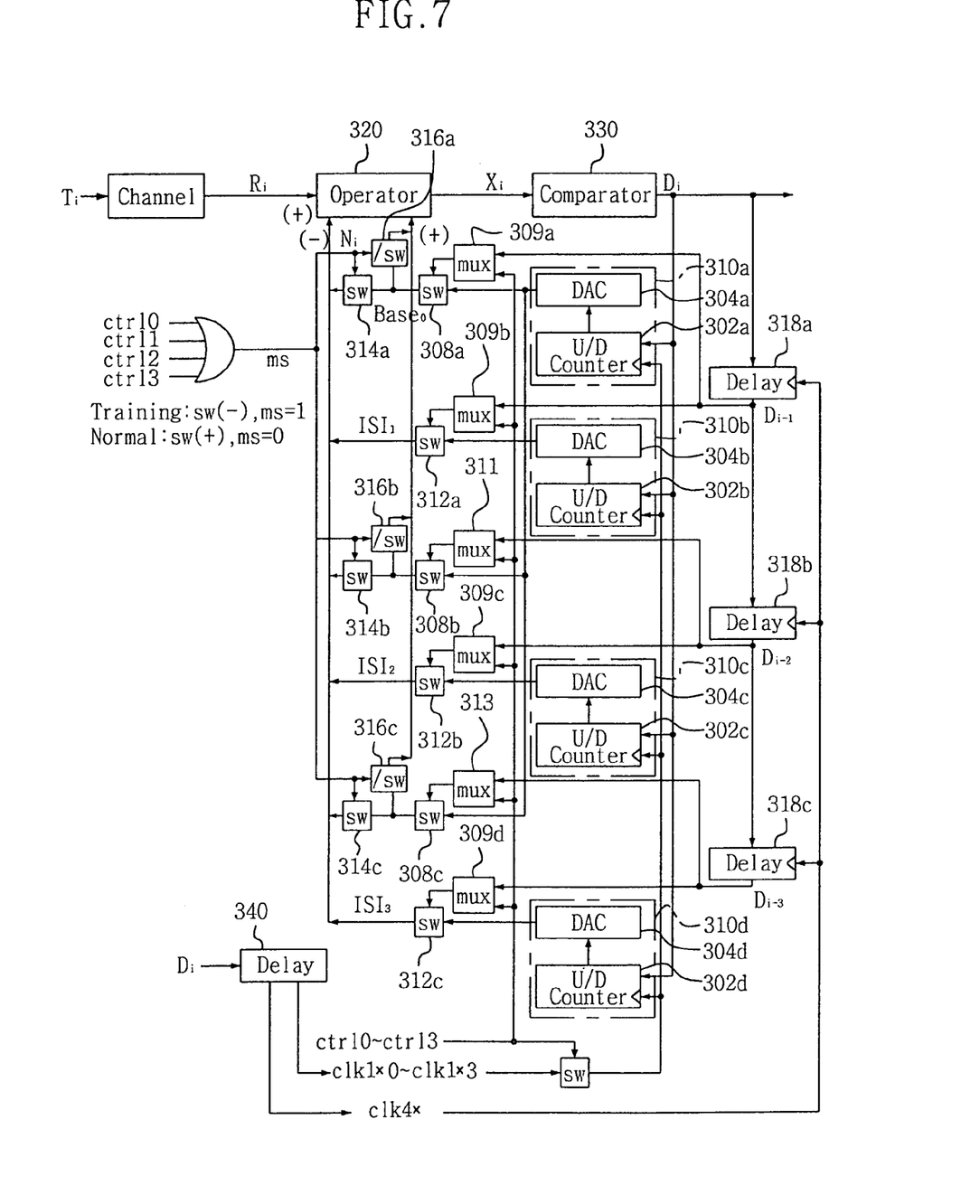
FIG. 7 is a block diagram of an ISI canceling device according to an embodiment of the present invention.

The configuration and operation of the ISI control device according to an embodiment of the present invention will be described in more detail with reference to FIGS. 5 to 7. FIG. 5 is a block diagram of an ISI canceling device in a training mode according to an embodiment of the present invention. FIG. 6 is a block diagram of an ISI canceling device in a normal mode according to an embodiment of the present invention. FIG. 7 is a block diagram of an ISI canceling device according to an embodiment of the present invention.

The embodiment of the present invention shown in FIGS. 5 to 7 is directed to an ISI canceling device in a DRAM memory device having a multi-drop bus architecture. Referring to FIGS. 5-7, the ISI canceling device includes a first storing unit 310a for storing a base voltage value of a received signal Ri having an ISI component, second storing units 310b, 310c and 320d for storing ISI values of the received signal Ri at time points when ISI is desired to be canceled, and an operator 320 for receiving the stored value Ni from the storing unit and subtracting the stored value from the received signal Ri. The ISI canceling device also includes a comparator 330 for amplifying an output signal Xi from the operator so that its logical state is determined. The comparator 330 feeds resultant data back to the storing units 310a, 310b, 310c and 310d in a training mode and outputs the resultant data in a normal mode. The ISI canceling device further includes a clock signal generating unit 340 for generating and providing a clock signal to the storing unit. The clock is provided at the time point when a base voltage value of the received signal Ri is desired to be stored and at the time point when ISI is desired to be canceled. In the normal mode, the clock signal generating unit 340 generates a clock signal having the same frequency as the data transmission frequency. In the training mode, the clock signal generating unit 340 sequentially generates a multi-phase clock signal having a frequency of one-fourth the data transmission frequency and having four phases. The phases of the clock signal enable the first and second storing units at the time point when the base voltage value of the received signal is desired to be stored and at the time points when ISI is desired to be canceled.

The operation of the ISI canceling device in the training mode according to an embodiment of the present invention is performed by each of the control signals ctrl0, ctrl1, ctrl2 and ctrl3, which control the operation periods of the first and second storing units and by clock signals clk1×0, clk1×1, clk1×2 and clk1×3. These clock signals are sequentially generated at a time point when the base voltage value of the received signal is desired to be stored and at the time points n1, n2 and n3 when ISI is desired to be canceled, as shown in FIG. 5. Further, in order to predict the base voltage value of the received signal and ISI values at the time points when ISI is desired to be canceled, a preamble signal is continuously applied to the ISI canceling device prior to transmitting the received signal.

The switch 306a is turned on in a period in which the first control signal ctrl0 is enabled. The up/down counter 302a in the first storing unit increases and decreases the output signal Xi from the operator until it is minimized, responsive to the clock signal clk1×0 that is generated when the base voltage value of the received signal having an ISI component is desired to be stored. The up/down counter 302a also stores the base voltage value Base0 of the received signal. Subsequently, the switch 306b is turned on in a period in which the first control signal ctrl0 is disabled and the second control signal ctrl1 is enabled. The up/down counter 302b in the second storing unit then increases and decreases the output signal Xi from the operator until it is minimized and stores an ISI value ISI1 at the first time point n1 when ISI is desired to be canceled, responsive to the clock signal clk1×1 generated the first time point n1 when ISI is desired to be canceled. Subsequently, the switch 306c is turned on in a period in which the second control signal ctrl1 is disabled and the third control signal ctrl2 is enabled. The up/down counter 302c in the second storing unit then increases and decreases the output signal Xi from the operator until it is minimized and stores an ISI value ISI2 at the second time point n2 when ISI is desired to be canceled, responsive to the clock signal clk1×2 generated at the second time point n2 when ISI is desired to be canceled. Likewise, the switch 306d is turn on in a period in which the third control signal ctrl2 is disabled and the fourth control signal ctrl3 is enabled. The up/down counter 302d in the second storing unit then increases and decreases the output signal Xi from the operator until it is minimized, and stores an ISI value ISI3 at the third time point n3 when ISI is desired to be canceled, responsive to the clock signal clk1×3 that is generated at a third time point n3 when ISI is desired to be canceled. The clock signals clk1×0, clk1×1, clk1×2 and clk1×3 are multi-phase clock signals that have four phases and are sequentially generated at the time point when the base voltage value of the received signal is desired to be stored and the time points n1, n2 and n3 when ISI is desired to be canceled. The up/down counters 302a, 302b, 302c and 302d and the digital-analog converters 304a, 304b, 304c and 304d in the first and second storing units operate at a frequency of one-fourth the data transmission frequency, in order to reduce the operating speed burden of the up/down counters and reduce data transmission speed of the digital-analog converters.

Once the base voltage value of the received signal and the ISI values at the time points when ISI is desired to be canceled are stored in the respective up/down counters in the storing unit, the training mode operation is completed and the normal mode operation begins. The operation of an ISI canceling device in the normal mode will be discussed according to an embodiment of the present invention. As shown in FIG. 6, responsive to a previous signal Di-1 of the output signal from the comparator, the switches 308a and 312a connected to the first and second storing units are turned on. These switches are turned on so that the base voltage value Base0 stored in the first storing unit and the ISI value ISI1, stored in the second storing unit, at the first time point when ISI is desired to be canceled are provided to the operator 320. Subsequently, the switches 308b and 312b connected to the first and second storing units are turned on responsive to a previous signal Di-2 of the output signal from the comparator. These switches are turned on so that the base voltage value Base0 stored in the first storing unit and the ISI value ISI2, stored in the second storing unit, at the second time point when ISI is desired to be canceled are provided to the operator 320. Likewise, the switches 308c and 312c connected to the first and second storing units are turned on responsive to a previous signal Di-3 of the output signal from the comparator. These switches are turned on so that the base voltage value Base0 stored in the first storing unit and the ISI value ISI3, stored in the second storing unit, at the third time point when ISI is desired to be canceled are provided to the operator 320.

The operator 320 subtracts, from the received signal Ri having an ISI component, a difference between each of the ISI values ISI1, ISI2 and ISI3 inputted from the second storing units and each base voltage value Base0 inputted from the first storing unit. That is, the operator 320 subtracts each of the ISI values ISI1, ISI2 and ISI3, inputted from the second storing units, from the received signal Ri having the ISI component, adds to the resultant value the base voltage value Base0 inputted from the first storing unit, and outputs the result. This allows for adapting the change in the base voltage value of the received signal by considering the base voltage value of the received signal in order to cancel only a pure ISI component. This step is executed because the respective ISI values ISI1, ISI2 and ISI3 stored in the second storing unit include an amplitude-reducing value for the received signal caused by the termination resistance, namely the base voltage value Base0. If the output signal Xi from the operator is enabled, the comparator 330 amplifies the output signal from the operator to output data Di.

The training and normal mode operations of the ISI canceling device according to an embodiment of the present invention will be described with reference to the overall block diagram of FIG. 7. In the training mode, respective control signals ctrl0, ctrl1, ctrl2 and ctrl3 are sequentially generated to control an operation period of the first and second storing units. Multi-phase clock signals clk1×0, clk1×1, clk1×2, and clk1×3 are also sequentially generated at a time point when a base voltage value of a received signal is desired to be stored and the time points when ISI is desired to be canceled. The control signals ctrl0, ctrl1, ctrl2 and ctrl3 are selected by the multiplexers (MUX) 309a, 309b, 309c, 311 and 313, and then cause the switches 308a, 308b, 308c, 312a, 312b and 312c connected with the first and second storing units to be turned on. The up/down counters 302a, 302b, 302c and 302d in the first and second storing units increase and decrease the output signal Xi from the operator until it is minimized responsive to the respective clock signals clk1×0, clk1×1, clk1×2 and clk1×3. These clock signals are generated during the operation period, and sequentially store the base voltage value Base0 or the respective ISI values ISI1, ISI2 and ISI3 at the time points when ISI is desired to be canceled. Subsequently, if the control signals ctrl0, ctrl1, ctrl2 and ctrl3 that control the operation period of the first and second storing units are all disabled, the device is then switched to the normal mode where a clock signal clk4 is generated. The clock signal clk4 has the same frequency as a data transmission frequency. Responsive to the clock signal clk4, the delay units 318a, 318b and 318c sequentially delay the output signal from the comparator to one-step previous in order to create signals Di-1, Di-2 and Di-3. The delayed signals Di-1, Di-2 and Di-3 are selected by the multiplexers 309a, 309b, 309c, 311 and 313, and then cause the switches 308a, 308b, 308c, 312a, 312b and 312c connected to the first and second storing units to be turned on. Accordingly, the respective ISI values ISI1, ISI2, ISI3 inputted from the second storing units and the base voltage value Base0 inputted from the first storing unit are provided to the operator 320. The operator 320 subtracts the respective ISI values ISI1, ISI2 and ISI3, inputted from the second storing units, from the received signal Ri having the ISI component, and adds, to the resultant value, the base voltage value Base0 inputted from the first storing unit. The (pure) ISI obtained by subtracting the base voltage value from the respective ISI values is thus canceled from the received signal and provided to the comparator 330. The comparator 330 amplifies the output signal Xi from the operator to output the data Di.

Figure 8:
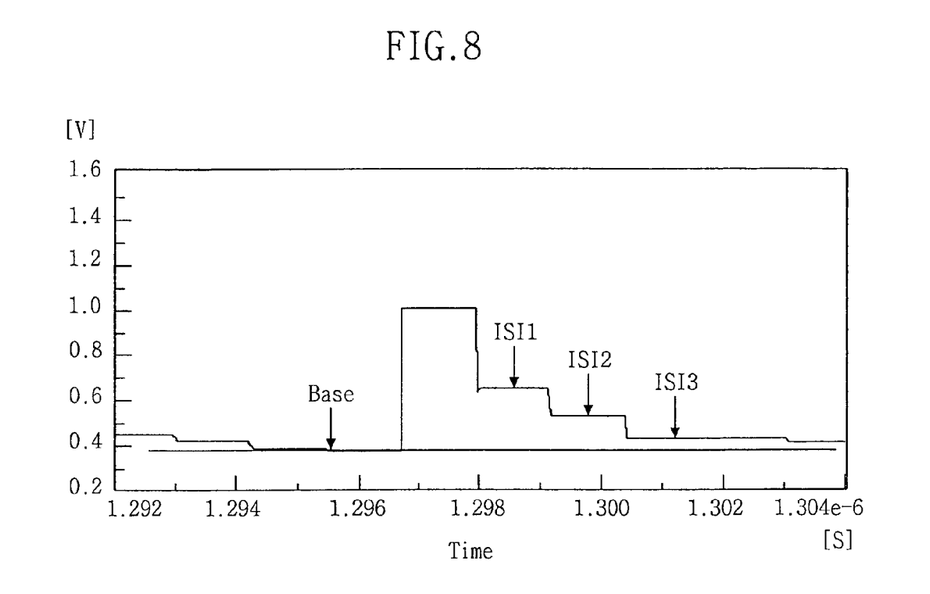
FIG. 8 is a received signal graph before operation of the ISI canceling device according to an embodiment of the present invention.
Figure 9:
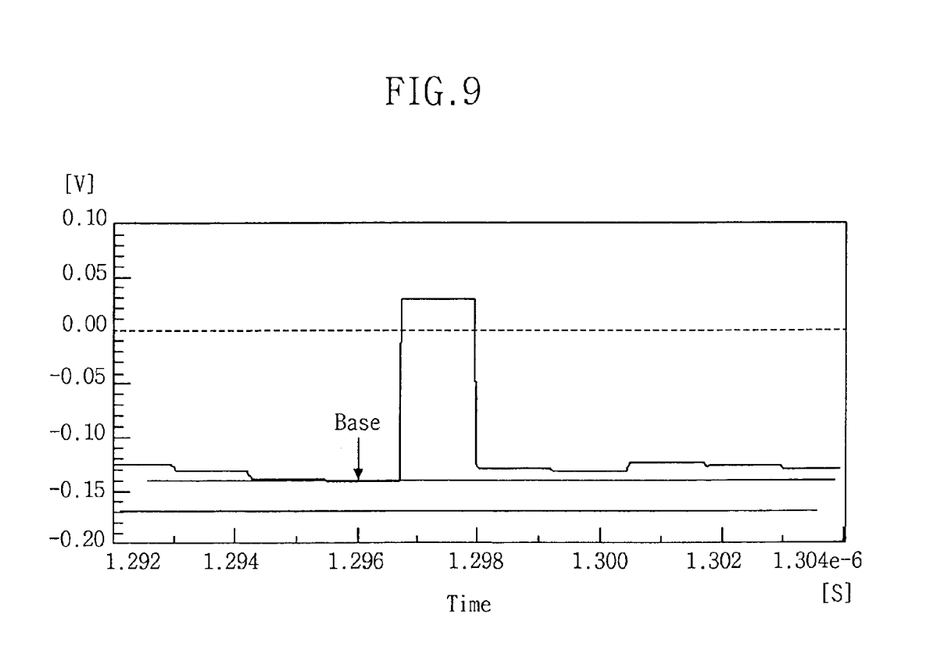
FIG. 9 is an output signal graph after operation of the ISI canceling device according to an embodiment of the present invention.

FIG. 8 is a graph showing a received signal before operation of an ISI canceling device according to an embodiment of the present invention. FIG. 9 is a graph showing an output signal after operation of an ISI canceling device according to an embodiment of the present invention. The graphs show the result of a simulation with a data transfer rate of 800 Mbps and a 1.8V stub-series terminated logic (SSTL) DRAM bus where two ranks are present in each of four slots. In the graphs the abscissa axis indicates time (s) and the ordinate axis indicates voltage (v).

FIG. 8 shows a received signal that is distorted by ISI before operation of the ISI canceling device according to an embodiment of the present invention, in which ISI values at respective points include a base voltage value. On the other hand, FIG. 9 shows an output signal in which the only pure ISI value has been canceled. This signal is obtained by subtracting the base voltage value from each of the ISI values at the points where ISI is desired to be canceled after operation of the ISI canceling device according to an embodiment of the present invention.

Figure 10:
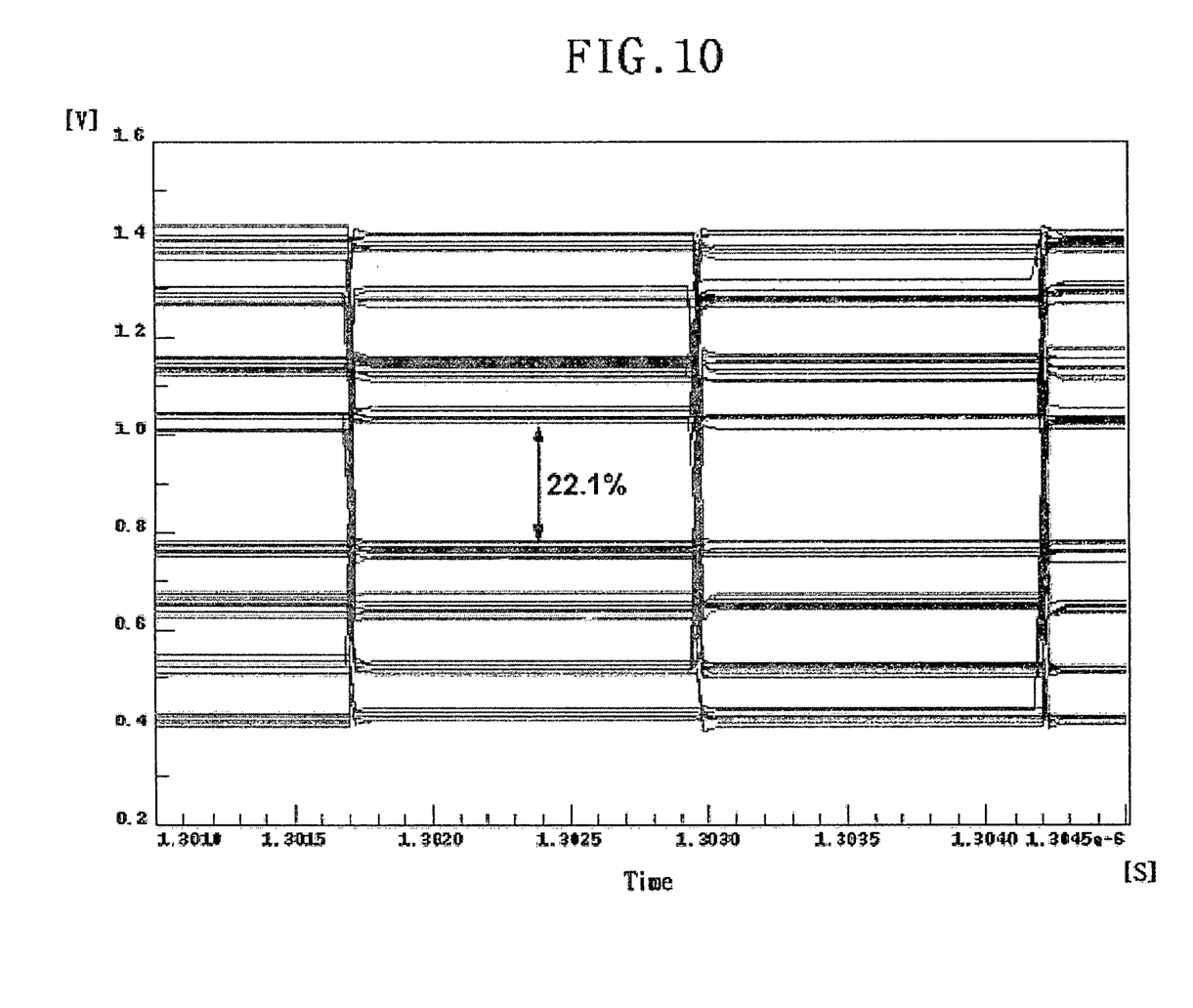
FIG. 10 is an eye diagram of a received signal's eye opening before operation of the ISI canceling device according to an embodiment of the present invention.
Figure 11:
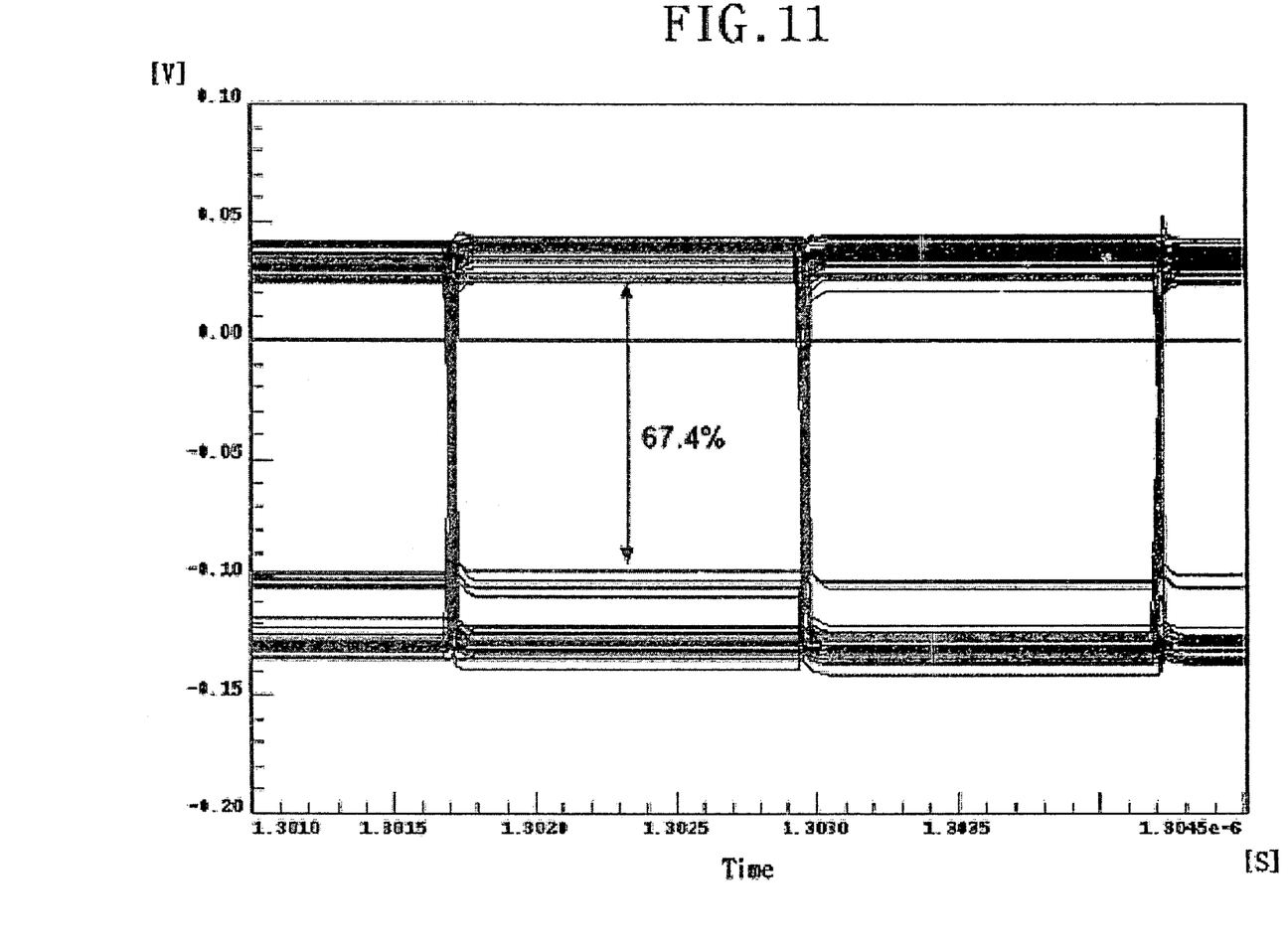
FIG. 11 is an eye diagram of an output signal's eye opening after operation of the ISI canceling device according to an embodiment of the present invention.

FIG. 10 is an eye diagram showing the eye opening of a received signal before operation of an ISI canceling device according to an embodiment of the present invention. FIG. 11 is an eye diagram showing an eye opening of an output signal after operation of an ISI canceling device according to an embodiment of the present invention. Likewise, the eye diagrams show the result of a simulation with a data transfer rate of 800 Mbps and a 1.8V stub-series terminated logic (SSTL) DRAM bus where two ranks are present in each of four slots. In the eye diagram the abscissa axis indicates time (s) and the ordinate axis indicates voltage (v).

As shown in FIGS. 10 and 11, the eye opening of the received signal before operation of the ISI canceling device according to an embodiment of the present invention is 22.1% while the eye opening of the output signal after operation of the ISI canceling device according to an embodiment of the present invention is 67.4%. This is an enhancement of the eye opening on the order of about 45%.

In the ISI canceling device according to an embodiment of the present invention, it is possible to adaptively cancel an ISI component of a received signal in a semiconductor memory device having multi-drop bus architecture. It is also possible to predict and cancel the ISI component of the received signal by performing the training operation using the preamble signal prior to transmission of the received signal.

Further, the device can adapt to variation of the base voltage value by predicting and considering the base voltage value from each ISI component because the predicted ISI component includes an amplitude-reducing value for the received signal caused by a termination resistance, namely, the base voltage value. Consequently, influence on signal integrity of the received signal can be reduced or minimized, thereby reducing a signal distortion caused by high-speed operation and increase of loading.

According to an embodiment of the present invention, it will be apparent to those skilled in the art that the ISI canceling device is not limited to the foregoing embodiments, and may be variously designed and applied without departing from the fundamental principles of the present invention. For example, although a DRAM memory device having multi-drop bus architecture has been described by way of example in the embodiments of the present invention, the present invention is not limited to DRAMs. The ISI canceling device according to the embodiments of the present invention may be applied to any semiconductor memory devices that are affected by ISI. And although a ISI canceling device comprising three second storing units has been described, it should be kept in mind that the ISI canceling device according to embodiments of the present invention can be variously applied and designed since the number of the second storing units and the number of bits used by the second storing unit can be adjusted based upon a change in the transfer rate or the interface environment.

As described above, the present invention provides the advantage that in the ISI canceling device according to an embodiment of the present invention, it is possible to adaptively cancel an ISI component of a received signal in a semiconductor memory device having multi-drop bus architecture. Embodiments can also predict and cancel the ISI component of the received signal by performing the training operation using the preamble signal prior to transmission of the received signal.

Further, embodiments of the present invention provide the advantage that the device can adapt to variation of the base voltage value by predicting and considering the base voltage value from each ISI component since the predicted ISI component includes an amplitude-reducing value for the received signal caused by a termination resistance, namely, the base voltage value. Consequently, influence on signal integrity of the received signal can be reduced or minimized, thereby reducing signal distortion caused from high-speed operation and increase of loading.

I claim:

1. An Inter Symbol Interference (ISI) canceling circuit, comprising:
a storing unit to store an ISI value associated with a received signal, where the storing unit includes:
a first storing unit to store a base voltage value corresponding to the received signal; and
at least one second storing unit to store ISI values corresponding to the received signal;
an operator to generate an operator output signal by subtracting the ISI value from the received signal; and
a comparator to manipulate the operator output signal responsive to an operating mode,
where the comparator is configured to provide the operator output signal to the storing unit in a training mode, and
where the comparator is configured to output the operator output signal in a normal mode.

2. The ISI canceling circuit of claim 1 further comprising:
a clock signal generating unit configured to generate clock signals and to provide the clock signals to the first and the at least one second storing units.

3. The ISI canceling circuit of claim 2 where the clock signals are sequentially generated multi-phase clock signals.

4. The ISI canceling circuit of claim 3 where the multi-phase clock signals have as many phases as the storing units.

5. The ISI canceling circuit of claim 1 where the operator is configured to generate the operator output signal responsive to a preamble signal.

6. The ISI canceling circuit of claim 5 where the preamble signal is a pulse signal having a duty cycle of 1/(quantity of storing units).

7. The ISI canceling circuit of claim 1 wherein the first storing unit comprises an up/down counter, which is configured to store at least one of (a) the base voltage value of the received signal and (b) the ISI value at a time point when ISI is desired to be canceled.

8. The ISI canceling circuit of claim 7 wherein the first storing unit further comprises a digital-analog converter, which is configured to convert at least one stored value stored in the up/down counter to an analog signal and to provide the analog signal to the operator.

9. The ISI canceling circuit of claim 1
where the first storing unit is configured to increase and decrease the operator output signal until it is minimized and to store the base voltage value of the received signal in the training mode, and
where the first storing unit is configured to provide the stored base voltage value to the operator in the normal mode.

10. The ISI canceling circuit of claim 9
where the at least one second storing unit is configured to increase and decrease the operator output signal from the operator until it is minimized and to store respective ISI values of the received signal corresponding to relevant clock signals in the training mode, and
where the at least one second storing unit is configured to provide each of the stored ISI values to the operator in the normal mode.

11. The ISI canceling circuit of claim 1 where the storing unit is configured to operate responsive to a clock signal.

12. The ISI canceling circuit of claim 1
where the operator is configured to subtract the ISI value from the receive signal until a difference is minimized in the training mode, and
where the operator is configured to subtract the ISI value and the base voltage value from the received signal in the normal mode.

13. An Inter Symbol Interference (ISI) canceling circuit, comprising:
a storing unit to store an ISI value associated with a received signal, where the storing unit includes:
an up/down counter to count an operator output signal; and
a digital-analog converter to convert the counted output signal to an analog signal;
an operator to generate the operator output signal by subtracting the ISI value from the received signal; and
a comparator to manipulate the operator output signal responsive to an operating mode,
where the comparator is configured to provide the operator output signal to the storing unit in a training mode,
where the comparator is configured to output the operator output signal in a normal mode, and
where the up/down counter and the digital-analog converter are configured to operate at a frequency of (data transmission frequency)/(quantity of storing units).

14. An Inter Symbol Interference (ISI) canceling circuit, comprising:
a storing unit to store an ISI value associated with a received signal, where the storing unit includes:
a first storing unit to store a base voltage value corresponding to the received signal; and
at least one second storing unit to store ISI values corresponding to the received signal;
an operator to generate an operator output signal by subtracting the ISI value from the received signal; and
a comparator to manipulate the operator output signal responsive to an operating mode.

15. The ISI canceling circuit of claim 14 further comprising:
a clock signal generating unit configured to generate clock signals and to provide the clock signals to the first and the at least one second storing units.

16. The ISI canceling circuit of claim 15 where the clock signals are sequentially generated multi-phase clock signals.

17. The ISI canceling circuit of claim 16 where the multi-phase clock signals have as many phases as the storing units.

18. An Inter Symbol Interference (ISI) canceling circuit, comprising:
a storing unit to store an ISI value associated with a received signal, where the storing unit includes:
an up/down counter to count an operator output signal; and
a digital-analog converter to convert the counted output signal to an analog signal;
an operator to generate the operator output signal by subtracting the ISI value from the received signal; and
a comparator to manipulate the operator output signal responsive to an operating mode,
where the up/down counter and the digital-analog converter are configured to operate at a frequency of (data transmission frequency)/(quantity of storing units).

19. An Inter Symbol Interference (ISI) canceling circuit, comprising:
a storing unit to store an ISI value associated with a received signal, where the storing unit includes:
a first storing unit to store a base voltage value corresponding to the received signal; and
at least one second storing unit to store ISI values corresponding to the received signal;
an operator to generate an operator output signal by subtracting the ISI value from the received signal; and
a comparator to manipulate the operator output signal responsive to an operating mode,
where the first storing unit is configured to increase and decrease the operator output signal until it is minimized and to store the base voltage value of the received signal in a training mode, and
where the first storing unit is configured to provide the stored base voltage value to the operator in a normal mode.

20. The ISI canceling circuit of claim 19
where the at least one second storing unit is configured to increase and decrease the operator output signal from the operator until it is minimized and to store respective ISI values of the received signal corresponding to relevant clock signals in the training mode, and
where the at least one second storing unit is configured to provide each of the stored ISI values to the operator in the normal mode.

21. The ISI canceling circuit of claim 20, wherein the comparator is configured to amplify an output of the operator and to output an amplified signal in the normal mode.

* * * * *

UNITED STATES PATENT AND TRADEMARK OFFICE
CERTIFICATE OF CORRECTION

| | | |
|---|---|---|
| PATENT NO. | : 7,583,768 B2 | Page 1 of 1 |
| APPLICATION NO. | : 11/020851 | |
| DATED | : September 1, 2009 | |
| INVENTOR(S) | : Won-Ju Lee | |

It is certified that error appears in the above-identified patent and that said Letters Patent is hereby corrected as shown below:

Column 11, line 1, the word "at" should read -- the at --.

Signed and Sealed this

Twenty-second Day of December, 2009

David J. Kappos
*Director of the United States Patent and Trademark Office*